US008244622B2

(12) United States Patent
Hughes, Jr. et al.

(10) Patent No.: US 8,244,622 B2
(45) Date of Patent: Aug. 14, 2012

(54) ORDER MATCHING PROCESS AND METHOD

(75) Inventors: John T. Hughes, Jr., Stratford, CT (US); Daniel F. Moore, New Haven, CT (US); Bruce E. Friedman, Monroe, CT (US); Timothy Vincent, Shelton, CT (US)

(73) Assignee: The NASDAQ OMX Group, Inc., Stockholm (SE)

( * ) Notice: Subject to any disclaimer, the term of this patent is extended or adjusted under 35 U.S.C. 154(b) by 1289 days.

(21) Appl. No.: 10/206,151

(22) Filed: Jul. 25, 2002

(65) Prior Publication Data

US 2003/0225673 A1 Dec. 4, 2003

Related U.S. Application Data

(60) Provisional application No. 60/385,988, filed on Jun. 5, 2002, provisional application No. 60/385,979, filed on Jun. 5, 2002.

(51) Int. Cl.
*G06Q 40/00* (2012.01)
(52) U.S. Cl. ........................................................ 705/37
(58) Field of Classification Search ...................... 705/37
See application file for complete search history.

(56) References Cited

U.S. PATENT DOCUMENTS

| 4,488,228 | A | * | 12/1984 | Crudele et al. ................ 714/21 |
| 4,809,168 | A | | 2/1989 | Hennessy et al. |
| 5,077,665 | A | | 12/1991 | Silverman et al. |
| 5,101,353 | A | | 3/1992 | Lupien et al. |
| 5,297,031 | A | | 3/1994 | Gutterman et al. |
| 5,440,749 | A | | 8/1995 | Moore et al. |
| 5,774,879 | A | | 6/1998 | Custy et al. |
| 5,812,988 | A | | 9/1998 | Sandretto |
| 5,827,071 | A | | 10/1998 | Sorensen et al. |
| 5,924,083 | A | * | 7/1999 | Silverman et al. ............. 705/37 |
| 6,014,643 | A | | 1/2000 | Minton |
| 6,035,287 | A | | 3/2000 | Stallaert et al. |
| 6,157,914 | A | | 12/2000 | Seto et al. |
| 6,202,125 | B1 | | 3/2001 | Patterson et al. |
| 6,247,000 | B1 | | 6/2001 | Hawkins et al. |
| 6,278,982 | B1 | | 8/2001 | Korhammer et al. |
| 6,317,726 | B1 | | 11/2001 | O'Shaughnessy |
| 6,317,728 | B1 | | 11/2001 | Kane |
| 6,442,533 | B1 | | 8/2002 | Hinkle |
| 6,505,174 | B1 | | 1/2003 | Keiser et al. |
| 6,601,044 | B1 | | 7/2003 | Wallman |
| 7,082,133 | B1 | | 7/2006 | Lor et al. |
| 7,110,975 | B2 | | 9/2006 | Marks de Chabris et al. |
| 7,167,844 | B1 | | 1/2007 | Leong et al. |
| 7,181,424 | B1 | | 2/2007 | Ketchum et al. |

(Continued)

OTHER PUBLICATIONS

John Wiley & Sons Ltd, Dictionary of Multimedia and Internet Applications: A Guide for Developers and Users, 1999, retrieved by xreferplus.com.*

(Continued)

*Primary Examiner* — Hani M Kazimi
*Assistant Examiner* — Chuks Onyezia
(74) *Attorney, Agent, or Firm* — Nixon & Vanderhye P.C.

(57) ABSTRACT

A trading process for trading securities in an electronic market includes a matching process to match a portion of a received order for a security against a security interest stored in an order book that resides in main memory of a computer system.

30 Claims, 3 Drawing Sheets

U.S. PATENT DOCUMENTS

| | | | |
|---|---|---|---|
| 7,184,441 | B1 | 2/2007 | Kadambi et al. |
| 7,246,092 | B1 | 7/2007 | Peterson et al. |
| 7,318,045 | B2 | 1/2008 | Baecker et al. |
| 7,496,533 | B1 | 2/2009 | Keith |
| 2001/0034686 | A1 | 10/2001 | Eder |
| 2002/0088647 | A1 | 7/2002 | Howorka et al. |
| 2002/0138401 | A1* | 9/2002 | Allen et al. ............ 705/37 |
| 2002/0156716 | A1 | 10/2002 | Adatia |
| 2002/0198820 | A1 | 12/2002 | Mills |
| 2003/0009413 | A1 | 1/2003 | Furbush et al. |
| 2003/0083973 | A1 | 5/2003 | Horsfall |
| 2003/0140027 | A1 | 7/2003 | Huttel et al. |
| 2003/0225671 | A1 | 12/2003 | Miller et al. |
| 2003/0225672 | A1 | 12/2003 | Hughes, Jr. et al. |
| 2003/0225673 | A1 | 12/2003 | Hughes, Jr. et al. |
| 2003/0225674 | A1 | 12/2003 | Hughes, Jr. et al. |
| 2003/0229557 | A1 | 12/2003 | Richmann et al. |
| 2003/0229566 | A1 | 12/2003 | Moore et al. |
| 2003/0229567 | A1 | 12/2003 | Serkin et al. |
| 2003/0229568 | A1 | 12/2003 | Richmann et al. |
| 2004/0034591 | A1 | 2/2004 | Waelbroeck et al. |
| 2004/0143542 | A1 | 7/2004 | Magill et al. |

OTHER PUBLICATIONS

An Exploratory Study of the Emerging Role of Electronic Intermediaries, Joseph P. Bailey and Yannis Bakos, International Journal of Electronic Commerce, vol. 1, No. 3 (Spring 1997), pp. 7-20, Published by: M.E. Sharpe, Inc.*

The Flash Crash: The Impact of High Frequency Trading on an Electronic Market_, Andrei Kirilenko, Mehrdad Samadi. Albert S. Kyle, Tugkan Tuzun, Jan. 18, 2011.*

Automation, trading costs, and the structure of securities trading industry, [PDF] cfr.org, I Domowitz, B Steil—Brookings-Wharton papers on financial services, 1999—i.cfr.org.*

What is Main Memory? From http://www.webopedia.com/TERM/M/main_memory.html.

Computer Data Storage from http://en.wikipedia.org/wiki/computer_storage.

RAM: A Brief Introduction from http://www.linfo.org/ram.html.

Facing a new reality: The SIA Conference addresses changing technology needs in a changing world. Editorial Staff. Traders Magazine. New York: Jun. 1, 2002. p. 1.

U.S. Appl. No. 10/206,150, filed Jul. 25, 2002, Office Action dated Jan. 9, 2009. [11 Pages].

U.S. Appl. No. 10/206,316, filed Jul. 25, 2002, Office Action dated Mar. 25, 2009. [17 Pages].

U.S. Appl. No. 10/206,789, filed Jul. 25, 2002, Office Action dated Dec. 31, 2007. [15 Pages].

U.S. Appl. No. 10/206,148, filed Jul. 25, 2002, Office Action dated Mar. 13, 2009. [11 Pages].

U.S. Appl. No. 10/206,149, filed Jul. 25, 2002, Office Action dated Mar. 17, 2009. [13 Pages].

U.S. Appl. No. 10/206,892, filed Jul. 25, 2002, Office Action dated Dec. 12, 2008. [16 Pages].

BPAI Decision dated Jan. 4, 2010 for U.S. Appl. No. 10/206,789 entitled "Order Chronicle Process and Method."

* cited by examiner

ORDER MATCHING PROCESS AND METHOD

RELATED APPLICATIONS

This application claims the priority of U.S. Provisional Patent Application No. 60/385,988, entitled "Security Processor", and filed on Jun. 5, 2002 and to U.S. Provisional Patent Application No. 60/385,979, entitled "Supermontage Architecture", and filed on Jun. 5, 2002.

BACKGROUND

This invention relates to electronic securities trading, and the processing and displaying of information relating to electronic securities trading.

Electronic equity markets, such as The Nasdaq Stock Market™ collect, aggregate, and display pre-trade information to market makers. In The Nasdaq Stock Market™, for example, this pre-trade information can take the form of a quote that represents a single or an aggregate of same-priced principal or agency orders. A market, such as The Nasdaq Stock Market™ also provides trading platforms through which market participants may trade securities in the marketplace.

SUMMARY

According to an aspect of this invention, a trading process for trading securities in an electronic market includes a matching process to match a portion of a received order for a security against a security interest stored in an order book that resides in main memory of a computer system.

According to a further aspect of the invention, a method for trading securities in an electronic market includes matching a portion of a received order for a security against a security interest of stored in an order book that resides in main memory of a computer system.

According to a further aspect of the invention, a computer program product residing on a computer readable medium includes instructions for trading securities in an electronic market cause a computer to match a portion of a received order for a security against a security interest stored in an order book that resides in main memory of a computer system.

One or more of the following features may also be included.

The main memory may be random access memory. The main memory may be a cache. The received order may be validated. The marketability of the received order may be checked against a state of the electronic market prior to matching the portion of the received order. The security interest may be retrieved from the order book in main memory. The security interest may be updated in the order book in main memory. The security interest in the order book in main memory may be added to. The matching of the portion of the received order may be reported to an execution log file. The matching may occur in a securities processor.

One or more advantages can be provided from the above. By matching security orders with security interests stored in a random access memory based order book, the orders may be quickly executed due to the fast access time of the order book. Further, besides quickly executing an order that can be matched, an order may be quickly entered into the order book if the order can not be matched. Additionally, if an order is not marketable the order can be quickly returned to the user. By providing faster matching more security transactions may be matched over a period of time thereby reducing the potential backlog of security transactions.

DETAILED DESCRIPTION

Figure 1:
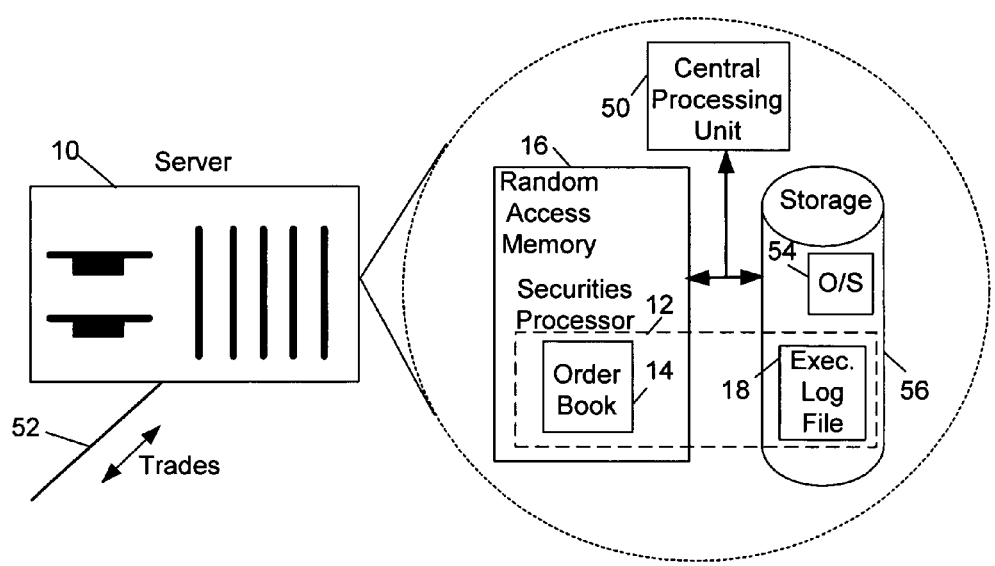
FIG. 1 is a block diagram of a server.

Referring to FIG. 1, a server 10 is shown that includes a securities processor 12 that stores securities trade information in an order book 14 that resides in random access memory 16 and an execution log file 18 that records orders executed against the information in the order book. The securities processor 12 is one portion of a computerized trading system, which trades securities electronically by processing one-sided or two-sided transactions entered by a user (e.g., a market participant). Users typically access and use the computerized trading system via a computer, thus allowing the users to enter security trades themselves or through professional traders/brokers. A central processing unit (CPU) 50 processes the trades, received over network 52, by executing instructions stored in an operating system (O/S) 54, along with other instructions, which are stored in server storage 56. In some implementations, the server storage 56 may be hard disk drive, a tape drive, an optical drive, a redundant array of independent disks (RAID), a random access memory (RAM), or a read-only memory (ROM), for example, or other similar sequential access storage device or devices that provides a persistent store of the recorded information. Typically, server 10 is a multi-processing, fault-tolerant system that includes multiple central processing units that each have a dedicated main memory system, in this implementation random access memory 16, or share a common main memory pool. While being executed by the central processing unit(s) of server 10, multiple instantiations of securities processor 12 may reside in the main memory system of server 10. Further, the processes and subroutines of securities processor 12 may also be present in various levels of cache memory incorporated into server 10.

Figure 2:
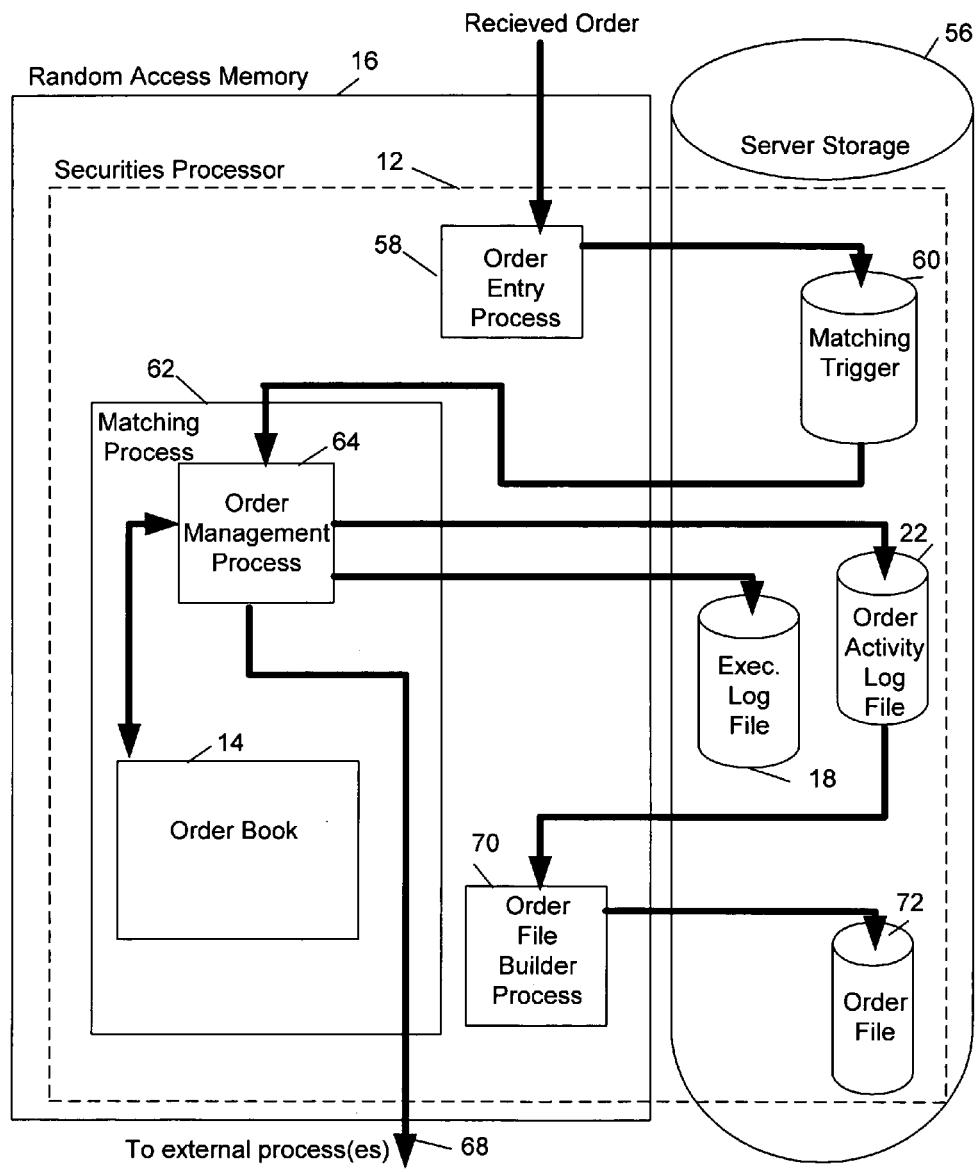
FIG. 2 is a block diagram of a random access memory and a server storage.

Referring to FIG. 2, the securities processor 12 that accesses portions of the server storage 56 and resides in the random access memory 16 is shown. For example, to perform a trade for a particular security, a user enters an order into the computerized trading system that is received and directed to the securities processor 12 assigned to the particular security. In some implementations, the securities processor 12 may be assigned to two or more securities in order to distribute the volume of securities trading over a number of securities processors. In other implementations, the securities processor 12 may be assigned to one heavily traded, high volume security to reduce trading volume of that security on other securities processors (not shown).

The securities processor 12 may be assigned to one particular security and store related security trading interest in the order book 14 residing in the random access memory 16 of that securities processor 12. By random access memory is meant main memory or alternatively one or more levels of cache memory. In some implementations a matching process may load portions of the order book into a level of cache memory from the main memory. Alternatively, the securities processor 12 may be assigned to multiple securities and correspondingly, the order book 14 residing in random access memory 16 of that securities processor stores the trading interests of those multiple securities. In some implementations, to store interests for multiple securities, the order book 14 in random access memory 16 may be partitioned into multiple sections, dimensions, or files to store the interests assigned to the securities processor 12. Here the order book 14 resides within the execution space of the random access memory 16 that has the matching process 62. However, in some implementations the order book 14 resides in an execution space of the random access memory 16 that is separate from another execution space having the matching process 62. Also, the order book 14 is exclusively accessible by the matching process 62 regardless whether or not both reside in the same execution space of the random access memory 16.

In addition to the support for a horizontally scalable architecture, the in memory order book 14 provides for reliable transaction processing at extremely high rates for an individual security. The internal state of the securities processor 12 is adjusted by processing incoming transactions in strict first-in, first-out serial sequence. The transaction rates capable for this approach exceeds those rates provided by traditional file based approaches and provide a reliable approach to use the order book 14 in random access memory 16 to hold the state of the book. By inserting, updating, and retrieving elements (records) from the in-memory order book 14 instead of a disk file, throughput substantially increases. Also, logic for allocating and freeing memory, maintaining lists and index tables associated with the in-memory order book 14 may be encapsulated random access memory 16.

In general, an order directed to the securities processor 12 is received by an order entry process 58 that performs cursory checking functions (e.g., order eligibility, order syntax, etc.) on the received order. If the received order fails one or more of the cursory functions the order is returned to the user, however, if the cursory functions are passed, the received order is logged in a matching trigger 60 stored in server storage 56. The matching trigger 60 queues the received order along with, for example, other orders, quotes, deliveries, or supervisory commands that are received by the securities processor 12 for the security or securities assigned to the securities processor. Typically the received order represents a new order for processing (e.g., match against open orders, add as new open orders, etc.) while the supervisory commands, for example may cancel, modify, or execute other similar actions against existing orders stored in the order book 14 residing in random access memory 16.

Once queued into the matching trigger 60, the received order is held in the matching trigger until pulled into a matching process 62 by an order management process 64. The matching process 62 matches portions of the received order, i.e., executes and allocates the received orders and stores the unmatched portion of the order in the order book 14. After pulling the received order, which is at least partially marketable and has cleared initial validations, the matching process 62 attempts to execute all or part of the received order with one or more orders on the contra side of the order book 14. Upon pulling the received order, the matching process 62 checks and validates the received order (e.g., marketability check, apply short sale rule, etc.) with definite and unambiguous knowledge of the current state of the market for the particular security. In some implementations, the validations are specific to orders received while some validations are specific for quotes received by the securities processor 12 or the validations may be common to quotes and orders. In this particular example, after the securities processor 12 receives an order, if the check or validation fails the received order is returned to the user (e.g. market participant) unexecuted.

One factor that is considered by the matching process 62 is the quantity of the received order. Matching of the received order continues until the entire received, marketable order is exhausted. In executing the received order to the fullest extent, a display size of the received order, as well as a reserve size, if any, are combined and the matching process 62 continues to execute this combined quantity of the received order against contra side orders stored in the order book 14 until exhaustion of the received order. To match against orders stored in the order book 14, the stored orders have an open status and are on the opposite side of the market to that of the received order. Once the received order is completely exhausted, the matching process 62 is complete and the execution is reported to other processes internal and external to the securities processor 12.

Another factor concerning the matching process 62 is the marketability of the received order. After passing the previous validations during the order entry process 58, the matching process 62 determines whether the received order is marketable. The received order is marketable if the order is a limit or other type of priced order and the received order's price locks or crosses the inside for the particular security. For a received order which is a bid, the inside is locked or crossed if the bid price is higher than the current best (i.e., lowest) ask price; alternatively, for a received order which is an ask order, the inside is locked or crossed if the ask order price is lower than the current best (i.e., highest) bid price. The received order can also be marketable if it is a market type order.

Subsequently, if the order is marketable, further validations are performed using current inside market prior to retrieving an order stored in the order book 14 to match against. However, if after the received order, or a portion of the received order, is determined marketable and subsequently matched against a security interest retrieved from the order book 14, the inside spread changes which may result in the price of the received order not locking or crossing the market that occurrence could end the matching process 62. Also, if the received order, or a portion of the received order, is not marketable or not fully executable, the remainder is added to the order book 14 for matching to a future order received by the securities processor 12.

After the received order is determined marketable and subsequent validations based on current inside market are passed, the order management process 64 searches contraside orders stored in the order book 14 that correspond to the particular security of the received order. To search the orders stored in the order book 14, the order management process 64 may use parameters associated with the received order. In some implementations, one parameter associated with the received order is a market participant ID that may be passed to the order management process 64 as a search parameter. By searching with the market participant ID, internalization, preferenced orders, or regular matching may be performed by the order management process 64. A matching preference may also be associated with the received order. For example, the received order may specify a matching condition that causes the matching algorithm to match based on a price/time priority, a price/fee/time priority, a price/size priority, or other preference. Also, the order management process 64 checks that a retrieved order from the order book 14 is available for matching (e.g., it is not in outage, etc.).

To initiate matching the received order, the matching process 62 determines the total quantities that can be executed in the current matching cycle. The quantities are, for example, the total executable display quantity for market participants non-unlisted trading privileges (non-UTPs), the total executable reserve quantity for non-UTPs, and the total executable UTP quantity. The UTP quantity is segregated in some embodiments because the UTPs are allocated against only after all the display quantities and reserve quantities for non-UTPs at a particular price level are exhausted. These quantities are used to determine how much quantity from the display and reserve size of a retrieved order may be used in a match and whether a retrieved UTP order can be filled. Once the total executable quantities are defined, the orders for allocation are retrieved from the order book 14 in accordance with the appropriate prioritization algorithm and the use of internalization.

The order management process 64 retrieves an order from the order book 14 and determines if the retrieved order meets the execution preference and requirements of the current match. For example, if a received order is specified with a prioritization preference of price/fee/time priority, and the order management process 64 retrieves an order from the order book 14 with fees, then this retrieved order is skipped. The order management process 64 continues to search the order book 14 for orders at a price level until an order that does not have access fees is found. If the order of this type is not found, the order management process 64 starts over and retrieves orders from the order book 14 that charge fees. After all orders residing in the order book 14, at a price level that meet the specified requirements for the match are exhausted, the matching cycle continues at the next price level provided the market is still crossed.

To execute a match between the received order and the order retrieved from the order book 14, the order management process 64 determines if the match, for example, is an automatic execution, an odd lot, or a delivery and assigns the appropriate execution type to the execution. After matching the received order, the order management process 64 updates the retrieved order in the order book 14. For example, the retrieved order may be completely exhausted and updated as 'executed' or, in another example, the retrieved order may have been partially executed and the remainder of the order is stored in the order book 14 with an open status. Also, during the matching of the received order, as the displayed size is exhausted, orders can be replenished from the reserve size. As portions of the received orders are matched by orders on the order book 14, the order management process 64 updates the order book 14 to reflect the matches. The order management process 64 also checks if the received order should be refreshed. If the order is refreshed and the market is still crossed, the order management process 64 continues matching. Otherwise, the order management process 64 completes by reporting the portion executed to the execution log file 18, stored in the server storage 56, and other processes included in the securities processor 12 and external 68 to the securities processor.

In some implementations matching process 62 includes a looping function that is triggered when the received order is identified as being executable. The matching process 62 attempts to match a portion of the received order and continues matching the received order as long as the received quantity is greater than zero and the market is still crossed. If either of these conditions fail, then the matching process 62 is completed and executions are reported to the execution log file 18 and the other processes internal and external 68 to the securities processor 12.

During operations of the securities processor 12, the order book 14 is exclusively accessible by the matching process 62, which serves as an interface and the single point of access to the order book. By restricting access of the order book 14 to the matching process 62, other processes included in or related to the securities processor 12 do not interfere with operations of the order book 14. For example, in some computerized trading systems an order book may, for example, be scanned to provide securities information to users during the same time period in which orders are retrieved from the order book for matching to a received order. Interruptions, such as this, for allowing access and sharing of the order book between the matching process 62 and other lower priority processes slows the matching process and reduces trading efficiency. Also, by restricting access to the order book 14, security information throughput significantly increases. Thus, by isolating the order book 14 to interact exclusively with the matching process 62, matching speed and efficiency increases.

Besides receiving and processing an order, other activities related to the security or securities assigned to the securities processor 12 may be received. For example, a quote update may be received by the securities processor 12 and pulled from the matching trigger 60 by the matching process 62 for adding the quote in the order book 14 or preparing the quote for matching. If the received quote does not lock or cross the market, the order book 14 is updated by replacing an existing quote or adding the received quote as an initial quote. In another example, a two-sided quote may be received by the securities processor 12 and pulled from the matching trigger 60 by the matching process 62. The side of the quote that does not lock or cross the market may update an existing quote or may add the quote as an initially received quote in the order book 14. The quote side that locks or crosses the inside is matched by the matching process 62 and any remainder will be added to the order book 14. Also, the marketable side of a received quote is removed from the order book 14 and replaced by any remainder after matching. A received quote may also include a relative update (e.g., a size increment or a size decrement) in which the matching process 62 adjusts the existing quote in the order book 14 for the relative size changes.

Supervisory commands (e.g., closing positions for a specific market participant, blocking a market participant's positions from being opened during the market opening process, purging a market participant's orders, or other similar commands) may also be received by the securities processor 12 and pulled from the matching trigger 60 by the matching process 62 for execution. However, supervisory command activities are complete, inclusive, and are implemented as modular plug-in components.

After matching, for example, the received order, or a portion of a received order, against one or more orders in the order book 14 and prior to pulling the next activity from the matching trigger 60, the order management process 64 reports the matching of the received order, or a portion of the received order, to an order activity log file 22 located in the server storage 56. Besides reporting the execution of the received order or a portion of the received order, the order management process 64 may report other activities, such as, executing a delivery order, executing an odd-lot order, adding a quote, canceling an order, canceling/replacing an order, purging an order, updating the order book 14 to reflect executions or adding an unmatched received order or a portion of the received order, or other similar activities associated to the securities processor 12. Also, in some implementations the order activity log file 22 may, for example, be a data file, a database, or other data storage structure that resides in server storage 56. Once stored in the order activity log file 22, the activities may be disseminated, for example, to trade participants, an Automated Confirmation Transaction (ACT) system, other interested parties, or other processes internal or external to the securities processor 12.

In particular, one process associated with the securities processor 12, which accesses the activities stored in the order activity log file 22 is an order file builder process 70. The order file builder process 70 constructs an order file 72 that provides near real-time disaster recovery of the order book 14 for a number of potential failure scenarios, as well as the contingent redeployment of activity processing to secondary securities processors (not shown). Each potential failure point in the trading system is supported by a level of redundancy, ranging from immediate system-level backup to delayed manual takeover. In the interest of rapid recovery for virtually all failures, a degree of automatic processing is allowed, but in general manual intervention is always an option. At lower failure levels, for example the failure of the securities processor 12, the securities processor is attempted to be restarted. As failure severity increases, such as the loss of the CPU 50 (shown in FIG. 1), the level of automation employed decreases. Ultimately, the most serious catastrophic failure, such as a loss of the entire server 10, may permit little automatic recovery.

To provide disaster recovery, the order file builder process 70 builds and maintains the order file 72 by retrieving the activities stored in the order activity log file 22. In some implementations, the order file 72 is stored on the server storage 56 and has the latest updates for open orders or orders with a special status (e.g., the market participant requests closing their positions due to equipment trouble, a display and reserve quantity are zero but the delivery quantity is greater that zero, etc.). While the order file builder process 70 stores activities related to updating the order book 14, activities irrelevant for reconstructing the order book 14, such as executed or canceling orders, are filtered from the material stored in the order file 72. By storing these activities, the order file 72 provides the current status of the security interests residing in the order book 14 to provide fast recovery in the event of a malfunction of the securities processor 12 or reassigning one or more securities to another security processor.

As mentioned, since the order book 14 resides in random access memory 16 such as main memory and in some implementations is accessed only by the matching process. In main memory, information may be quickly stored on the order book as compared, for example, to order books residing in a magnetic medium (e.g., diskette, hard disk, etc.) which typically have much longer access times for storing and retrieving orders. Due to the fast accessibility of the random access memory 16, the order book 14 may also be quickly rebuilt by retrieving information stored in the order file 72, as compared to rebuilding order books stored on a slower access hard disk or other magnetic medium.

Figure 3:
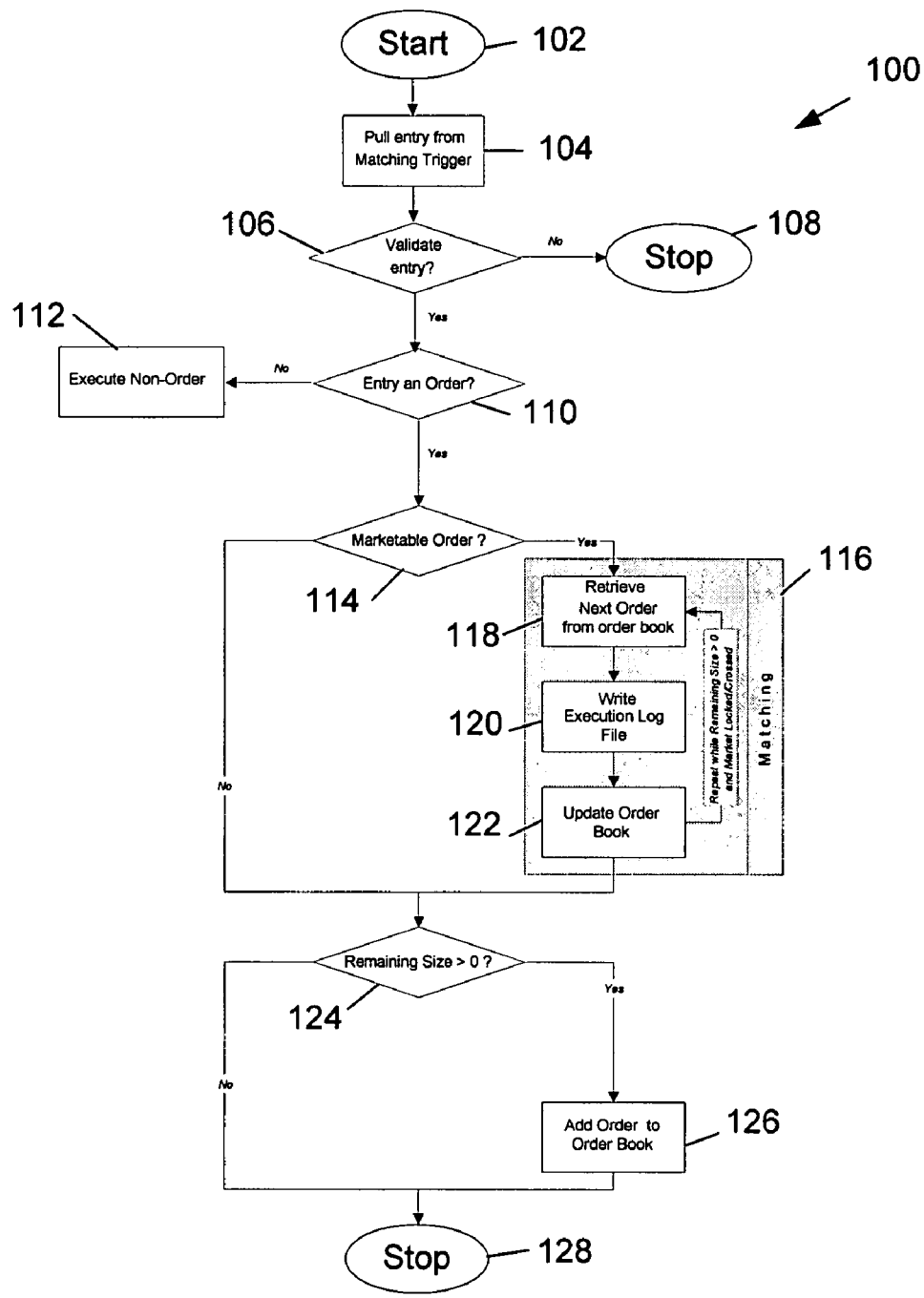
FIG. 3 is a flow chart for using a random access memory resident order book.

Referring to FIG. 3, a procedure 100 for matching against a security interest stored in an order book residing in random access memory is shown. The procedure 100 starts 102 by pulling 104, for example, an entry for a particular security from the matching trigger 60 (shown in FIG. 2) included in the securities processor 12 (also shown in FIG. 2) that is assigned to the security and validating 106 the entry. In some implementations, the entry may be a supervisory request, such as a cancel order request for canceling a remaining quantity of an order (i.e., the quantity of the order that is still open for matching) or for canceling a delivery quantity (i.e., the quantity of the order that is still pending in a delivery response from the one or more market participants to which portions of the order were delivered). The supervisory request may also, for example, cancel and replace orders in which the size of an original order is replaced by a new size or an order size may be incremented or decremented by an amount. This supervisory request may be validated 106 for example, by checking the eligibility of the market participant that entered the request.

The entry pulled 104 from the matching trigger 60 may also be a quote that may be an initial quote to establish a position, a quote update, or a quote change. To validate 106 the quote entry attributes, a number of validations are performed by the matching procedure 100. For example, the validation may determine whether the quote is essentially an initial quote to establish a position, a quote update with a price change, or simply a quote update for maintaining the quote size. If a quote update contains a relative price or size change, the resulting price or size, including reserve and refresh size changes, are validated to be within allowable boundaries (e.g., greater than zero, less than maximum size, etc.). If the validating 106 fails, the quote entry is rejected and no further processing occurs 108.

The entry pulled 104 from the matching trigger 60 may also include an order entry that may enter a new order or modify an existing order and may result in either adding a new order, or a portion of a new order, to the order book 14 (shown in FIG. 2) or matching the new order, or a portion of the new order. A number of validations 106 are executed for an order entry, for example, since an order can establish a display quote, the market participant may be checked to determine if the participant is required to maintain a two-sided display quote and that the entry order will not establish one side while the other side remains closed. The order entry may also be validated 106 to determine of there is an alternate clearing number on the order and if the clearing number is valid. Again, is the validation 106 is not met, the order is rejected and the procedure 100 stops 108.

After passing validation 106, the procedure determines 110 if the entry includes an order. If the entry does not include an order, the validated entry (e.g., supervisory request) is executed 112. If the entry includes an order, the procedure 100 determines if the order is marketable 114. As mentioned, an incoming order is marketable if its price locks or crosses the inside. For example, an incoming bid order is marketable if its price is higher than the current best (i.e., lowest) ask price; and alternatively, an incoming ask order is marketable if its price is lower than the current best (i.e., highest) bid price. If an order is marketable 114, the order is also checked, for example, for price reasonability, if the incoming order is preferenced to a particular market participant, if the order is subject to the short sale rule, or if the order contains odd lots.

If the order is marketable 114, the order enters a matching cycle 116 of the procedure 100. During a matching cycle 116, the procedure 100 retrieves 118 the next appropriate order on the other side of the order book 14 in a sequence in accordance with the chosen matching algorithm. To retrieve the first order, the market participant ID may be set, for example, to "regular" if the incoming order is not preferenced to a particular market participant. The market participant ID may also be set to "preferenced" if the incoming order is preferenced to a particular market participant, or set to "no internalization" if the anti-internalization qualifier on the incoming order is set. The order book 14 orders are searched and the next appropriate order is retrieved, for the matching cycle, based on, for example, the market participant ID and the matching algorithm. For each successful match, the procedure 100 writes 120 an execution record to the execution log file 18 (shown in FIG. 2). Most of the attributes on an execution record are populated using the original order record unless otherwise specified. After the procedure 100 writes 120 the execution report, for the current matching cycle 116, the order book 14 is updated 122 to reflect the a change in the existing order on the book. Depending on the overall remaining quantities on the order to be updated, the status of that order may need to be changed, for example, to "executed" if the sum of the display quantity, reserve quantity, and delivery quantity is zero (i.e., no more available quantity and no portions in delivery). In another example, the order status may be changed to "in delivery", if the display quantity and reserve quantity are zero but delivery quantity is greater than zero (i.e., no more available quantity but one or more portions in delivery). After updating 122 the order book 14, the procedure repeats by retrieving 118 another order from the order book so long as the market is still locked or crossed.

Upon the completing the matching cycle 116, the procedure 100, determines 124 if the marketable order has been reduced to zero. Also, if the order entry was not marketable, the procedure 100 also determines 124 if the presently unmarketable entry contains one or more orders. If the order entry contains one or more orders, the procedure 100 adds 126 the order(s) to the order book 14 and the procedure 100 stops 128. Also, if there are no orders present the procedure 100 stops 128.

Although some implementations have been described, other implementations are also within the scope of the following claims.

The order book described herein is not limited to the software embodiment described above; it may find applicability in any computing or processing environment. The order book may be implemented in hardware, software, or a combination of the two. For example, the order book may be implemented using circuitry, such as one or more of programmable logic (e.g., an ASIC), logic gates, a processor, and a memory.

The order book may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the order book. The order book may also be implemented as a machine-readable storage medium, configured with a computer program, where, upon execution, instructions in the computer program cause a machine to operate to perform the functions of the order book described above.

Embodiments of the order book may be used in a variety of applications. Although the order book is not limited in this respect, the order book may be implemented with memory devices in microcontrollers, general purpose microprocessors, digital signal processors (DSPs), reduced instruction-set computing (RISC), and complex instruction-set computing (CISC), among other electronic components.

Embodiments of the order book may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer system for trading securities in an electronic trading venue, the computer system comprises:
    a processor;
    a main memory that stores:
        an order book the order book comprising a plurality of unfulfilled orders to trade a particular security that trades on the electronic trading venue, with the orders sent for execution against contra side interest; and
        a first portion of a computer program product that accesses the order book comprising instructions to:
            find the orders in the order book that can be matched to a received order sent to the electronic trading venue;
            match a portion of a received order for a security against one or more orders stored in the order book that resides in the main memory, with the first portion of the computer program having exclusive access to the order book; and
    a remaining portion of a computer program product to access a log stored in a persistent storage device and to process activities related to processing of securities other than to match the received order to orders in the order book, with the remaining portion having access to the order book in the main memory only through the first portion of the computer program product;
    one or more persistent, computer readable storage device that store the computer program product and the log to store results of related to processing of securities other than to match the received order to orders stored in the order book.

2. The computer system of claim 1 wherein the main memory is random access memory.

3. The computer system of claim 1 wherein the main memory is a cache.

4. The computer system of claim 1 wherein the remaining portions of the computer program product further comprise instructions to validate the received order.

5. The computer system of claim 1 wherein the remaining portions of the computer program product further comprise instructions to check marketability of the received order against a state of the electronic market prior to matching the portion of the received order.

6. The computer system of claim 1 wherein the first portion of the computer program product further comprises instructions to retrieve from main memory orders from the order book residing in main memory to match the retrieved orders to the received order.

7. The computer system of claim 1 wherein the first portion of the computer program product further comprise instructions to update status of orders in the order book in main memory.

8. The computer system of claim 1 wherein the remaining portions of the computer program product further comprise instructions to add subsequent unfulfilled orders to the security interest in the order book in main memory.

9. The computer system of claim 1 wherein the remaining portions of the computer program product further comprise instructions to report matching the portion of the received order to an execution log file stored on the persistent computer readable medium.

10. The computer system of claim 1 wherein the instructions to match that have exclusive access to the order book in the main memory reside in the same execution space of the main memory as the order book.

11. A computer-implemented method for trading securities in an electronic market comprises:
  matching by a computer system executing a first portion of instructions of a computer program, at least a portion of a received order for a security against a security interest in an order book that resides in a main memory of the computer system;
  accessing by the computer system, executing a remaining portion of the computer program, an execution log stored in a persistent, computer readable storage medium by:
    processing by the computer system activities related to processing of securities other that matching of the received order to orders stored in the order book and with accessing to the order book in the main memory only through the first portion of the computer program product; and
    storing in an execution log file, a record of the portion of the received order matched to the security interest in the order book, with the execution log file stored on a persistent computer readable device of the computer system.

12. The method of claim 11 wherein the main memory is random access memory.

13. The method of claim 11 wherein the main memory is a cache.

14. The method of claim 11 further comprising:
  validating the remaining portion of the computer program the received order.

15. The method of claim 11 further comprising:
  checking the remaining portion of the computer program marketability of the received order against a state of the electronic market prior to matching the portion of the received order.

16. The method of claim 11 further comprising:
  retrieving by the first portion of the computer program the security interest from the order book in main memory.

17. The method of claim 11 further comprising:
  updating by the first portion of the computer program the security interest in the order book in main memory.

18. The method of claim 11 further comprising:
  adding by the first portion of the computer program to the security interest in the order book in main memory.

19. The method of claim 11 further comprising:
  reporting by the remaining portion of the computer program matching the portion of the received order to an execution log file.

20. The method of claim 11 wherein the first portion of the computer program for matching has exclusive access to the order book in the main memory and resides in the same execution space of the main memory as the order book.

21. A computer program product residing on a computer readable medium comprises instructions for trading securities in an electronic market to cause a computer to:
  match at least a portion of a received order for a security against a security interest in an order book that resides in main memory of a computer system; with instructions to match comprising instructions to:
  retrieve an order from the order book;
  match an incoming order to an order in the order book by a first portion of instructions of the computer program product that limit access to the order book to the first instructions; and
  update a status of the retrieved order in the order book to one of completely exhausted, executed, and open when a remainder of the order that has not been executed, remains in the order book; and
  access a log stored on a persistent storage device for processing activities related to processing of securities other that instructions to match the received order to orders stored in the order book by a remaining portion of instructions of the computer program product that access the order book in the main memory only through the first portion of the computer program product.

22. The computer program product of claim 21 wherein the instructions assess the main memory that is random access memory.

23. The computer program product of claim 21 wherein the instructions assess the main memory that is a cache.

24. The computer program product of claim 21 the remaining instructions further comprising instructions to cause the computer to:
  validate the received order.

25. The computer program product of claim 21 the remaining instructions further comprising instructions to cause the computer to:
  check marketability of the received order against a state of the electronic market prior to matching the portion of the received order.

26. The computer program product of claim 21 the first instructions further comprising instructions to cause the computer to:
  retrieve the security interest from the order book in main memory.

27. The computer program product of claim 21 the first instructions further comprising instructions to cause the computer to:
  update the security interest in the order book in main memory.

28. The computer program product of claim 21 the remaining instructions further comprising instructions to cause the computer to:
  add to the security interest in the order book in main memory.

29. The computer program product of claim 21 the remaining instructions further comprising instructions to cause the computer to:
  report matching the portion of the received order to an execution log file.

30. The computer program product of claim 21 wherein the instructions to match that have exclusive access to the order book in the main memory reside in the same execution space of the main memory as the order book.

* * * * *